US011963489B2

(12) United States Patent
Kitahara et al.

(10) Patent No.: US 11,963,489 B2
(45) Date of Patent: Apr. 23, 2024

(54) GARDENING TRIMMER

(71) Applicant: MAKITA CORPORATION, Anjo (JP)

(72) Inventors: Mikihiro Kitahara, Anjo (JP);
Tomoyuki Kutsuna, Anjo (JP);
Nozomu Iwamoto, Anjo (JP);
Tomoyuki Ota, Anjo (JP)

(73) Assignee: MAKITA CORPORATION, Anjo (JP)

( * ) Notice: Subject to any disclaimer, the term of this patent is extended or adjusted under 35 U.S.C. 154(b) by 292 days.

(21) Appl. No.: 17/321,949

(22) Filed: May 17, 2021

(65) Prior Publication Data

US 2021/0360863 A1   Nov. 25, 2021

(30) Foreign Application Priority Data

May 20, 2020   (JP) ................................ 2020-088209

(51) Int. Cl.
*A01G 3/053* (2006.01)
*A01G 3/04* (2006.01)

(52) U.S. Cl.
CPC ...... *A01G 3/053* (2013.01); *A01G 2003/0461* (2013.01)

(58) Field of Classification Search
CPC ........ A01G 3/04; A01G 3/0417; A01G 3/047; A01G 3/053; A01G 2003/0461; A01D 34/135; A01D 34/14; A01D 34/16
(Continued)

(56) References Cited

U.S. PATENT DOCUMENTS 2,787,111 A  *  4/1957  Templeton ........... A01D 34/135
                                                    56/297
3,798,768 A  *  3/1974  Cowley ................. A01G 3/053
                                                    30/223
(Continued)

FOREIGN PATENT DOCUMENTS

| CN | 103125278 A | 6/2013 |
| CN | 103518553 A | 1/2014 |

(Continued)

OTHER PUBLICATIONS

Communication dated Apr. 12, 2023 issued by the State Intellectual Property Office in the P.R.China in application No. 202110416772.3.
(Continued)

*Primary Examiner* — Jason Daniel Prone
(74) *Attorney, Agent, or Firm* — Sughrue Mion, PLLC

(57) ABSTRACT

A gardening trimmer may include: a conversion mechanism for converting rotational motion of a prime mover to linear motion along a first direction; a blade for moving in reciprocating motion relative to a guide bar and including a plurality of slots; and a plurality of guide members each disposed in a corresponding slot of the plurality of slots of the blade. The plurality of slots may include: at least one first slot in which a corresponding guide member of the guide members that is connected to a housing is disposed. A combination of the slots and the guide members may include: a first combination to reduce frictional resistance generated by the reciprocating motion; and a second combination to reduce vibration generated by the reciprocating motion, and at least one combination of the at least one first slot and its corresponding guide member is the second combination.

8 Claims, 5 Drawing Sheets

(58) Field of Classification Search
USPC .................................. 30/208–210, 215–222
See application file for complete search history.

(56) References Cited

U.S. PATENT DOCUMENTS

| | | | | |
|---|---|---|---|---|
| 4,280,276 | A * | 7/1981 | Comer | A01G 3/053 30/144 |
| 4,619,045 | A * | 10/1986 | Mayer | A01G 3/053 30/216 |
| 5,075,972 | A * | 12/1991 | Huang | A01G 3/053 30/216 |
| 5,138,908 | A * | 8/1992 | Raetz | A01G 3/053 76/104.1 |
| 5,153,996 | A * | 10/1992 | Kuzarov | A01G 3/053 30/216 |
| 5,987,753 | A * | 11/1999 | Nagashima | A01G 3/053 30/216 |
| 6,415,515 | B1 * | 7/2002 | Wheeler | A01G 3/053 30/208 |
| 6,467,990 | B1 | 10/2002 | Kremsler et al. | |
| 6,594,879 | B2 * | 7/2003 | Wheeler | A01G 3/053 100/295 |
| 6,910,276 | B2 * | 6/2005 | Huang | A01G 3/053 30/216 |
| 7,406,770 | B2 * | 8/2008 | Mace | A01D 34/14 30/216 |
| 7,788,811 | B2 * | 9/2010 | Hanada | A01G 3/053 30/216 |
| 8,826,546 | B2 * | 9/2014 | Svennung | A01G 3/053 30/216 |
| 8,959,780 | B2 * | 2/2015 | Masalin | A01G 3/053 30/208 |
| 9,736,991 | B2 * | 8/2017 | Hanada | A01G 3/053 |
| 10,321,636 | B2 * | 6/2019 | Peterson | A01G 3/053 |
| 10,537,069 | B2 * | 1/2020 | Wykman | A01G 3/04 |
| 11,419,276 | B2 * | 8/2022 | Kitahara | A01G 3/053 |
| 2011/0047952 | A1 | 3/2011 | Matsuo et al. | |
| 2013/0326885 | A1 * | 12/2013 | Kaupp | A01G 3/053 30/208 |
| 2014/0007717 | A1 | 1/2014 | Kato et al. | |
| 2016/0330914 | A1 | 11/2016 | Tang | |
| 2018/0206410 | A1 * | 7/2018 | Liu | A01G 3/053 |
| 2019/0239446 | A1 | 8/2019 | Kamiya | |
| 2019/0338839 | A1 | 11/2019 | Hanada et al. | |
| 2020/0045889 | A1 * | 2/2020 | Shimizu | A01G 3/053 |

FOREIGN PATENT DOCUMENTS

| | | |
|---|---|---|
| CN | 210352272 U | 4/2020 |
| JP | 11-243778 A | 9/1999 |
| JP | 2001-116021 A | 4/2001 |
| JP | 2006-141211 A | 6/2006 |
| JP | 2008-11793 A | 1/2008 |
| JP | 2008-136370 A | 6/2008 |
| JP | 2013-128421 A | 7/2013 |
| JP | 2014-18183 A | 2/2014 |
| JP | 2019-134693 A | 8/2019 |
| JP | 2019-193598 A | 11/2019 |
| JP | 2020-25505 A | 2/2020 |
| WO | 2014/119174 A1 | 8/2014 |

OTHER PUBLICATIONS

Communication dated Oct. 13, 2023 issued by the State Intellectual Property Office of the P.R. China in application No. 202110416772.3.

Japanese Office Action dated Sep. 19, 2023 in Application No. 2020-088209.

* cited by examiner

GARDENING TRIMMER

CROSS-REFERENCE TO RELATED APPLICATION

This application claims priority to Japanese Patent Application No. 2020-88209 filed on May 20, 2020, the entire contents of which are hereby incorporated by reference into the present application.

TECHNICAL FIELD

This disclosure herewith relates to a gardening trimmer.

BACKGROUND

Japanese Patent Application Publication No. 2001-116021 describes a gardening trimmer. The gardening trimmer includes a housing, a guide bar, a prime mover disposed in the housing, a conversion mechanism configured to convert rotational motion of the prime mover to linear motion in a first direction, a blade, and a plurality of guide members. The blade is configured to move in reciprocating motion relative to the guide bar along the first direction in response to the linear motion of the conversion mechanism and includes a plurality of slots extending along the first direction. The guide members are each disposed in a corresponding slot of the plurality of slots of the blade and are configured to guide the relative reciprocating motion of the blade.

SUMMARY

In the above gardening trimmer, when the guide members are respectively in contact with inner side surfaces of the slots, vibration generated by reciprocating motion of the blade is reduced due to distances between the guide members and the inner side surfaces of the slots becoming small while frictional resistance which the blade receives becomes higher. On the other hand, when the guide members are not in contact with the inner side surfaces of the slots, the vibration by the reciprocating motion of the blade is generated due to the distances between the guide members and the inner side surfaces of the slots becoming large while the frictional resistance which the blade receives is reduced. The disclosure herein discloses art for reducing vibration generated by reciprocating motion of a blade and also reducing frictional resistance which the blade receives.

The disclosure herein discloses a gardening trimmer. The gardening trimmer may comprise: a housing; a prime mover disposed in the housing; a guide bar extending from the housing; a conversion mechanism configured to convert rotational motion of the prime mover to linear motion along a first direction; a blade configured to move in reciprocating motion relative to the guide bar along the first direction in response to the linear motion of the conversion mechanism and including a plurality of slots extending along the first direction; and a plurality of guide members each disposed in a corresponding slot of the plurality of slots of the blade and configured to guide the relative reciprocating motion of the blade. The plurality of slots may comprise: at least one first slot in which a corresponding guide member of the guide members that is connected to the housing is disposed; and at least one second slot in which a corresponding guide member of the guide members that is connected to the guide bar is disposed. A combination of the slots and the guide members may comprise: a first combination configured to reduce frictional resistance generated by the reciprocating motion of the blade; and a second combination configured to reduce vibration generated by the reciprocating motion of the blade. At least one combination of the at least one first slot and its corresponding guide member may be the second combination.

When the conversion mechanism converts the rotational motion of the prime mover to the linear motion, vibration in a direction perpendicular to a shaft of the prime mover and to the first direction is transmitted to the blade. Due to this, if the combination of the first slot and its corresponding guide member that is connected to the housing is the first combination, the vibration of the blade cannot sufficiently be reduced. In the above configuration, since at least one combination of the at least one first slot and its corresponding guide member is the second combination, the vibration of the blade can be reduced. Further, since the combination of the slots and the guide members comprises the first combination, the frictional resistance generated by the reciprocating motion of the blade can be reduced.

DETAILED DESCRIPTION

Figure 1:
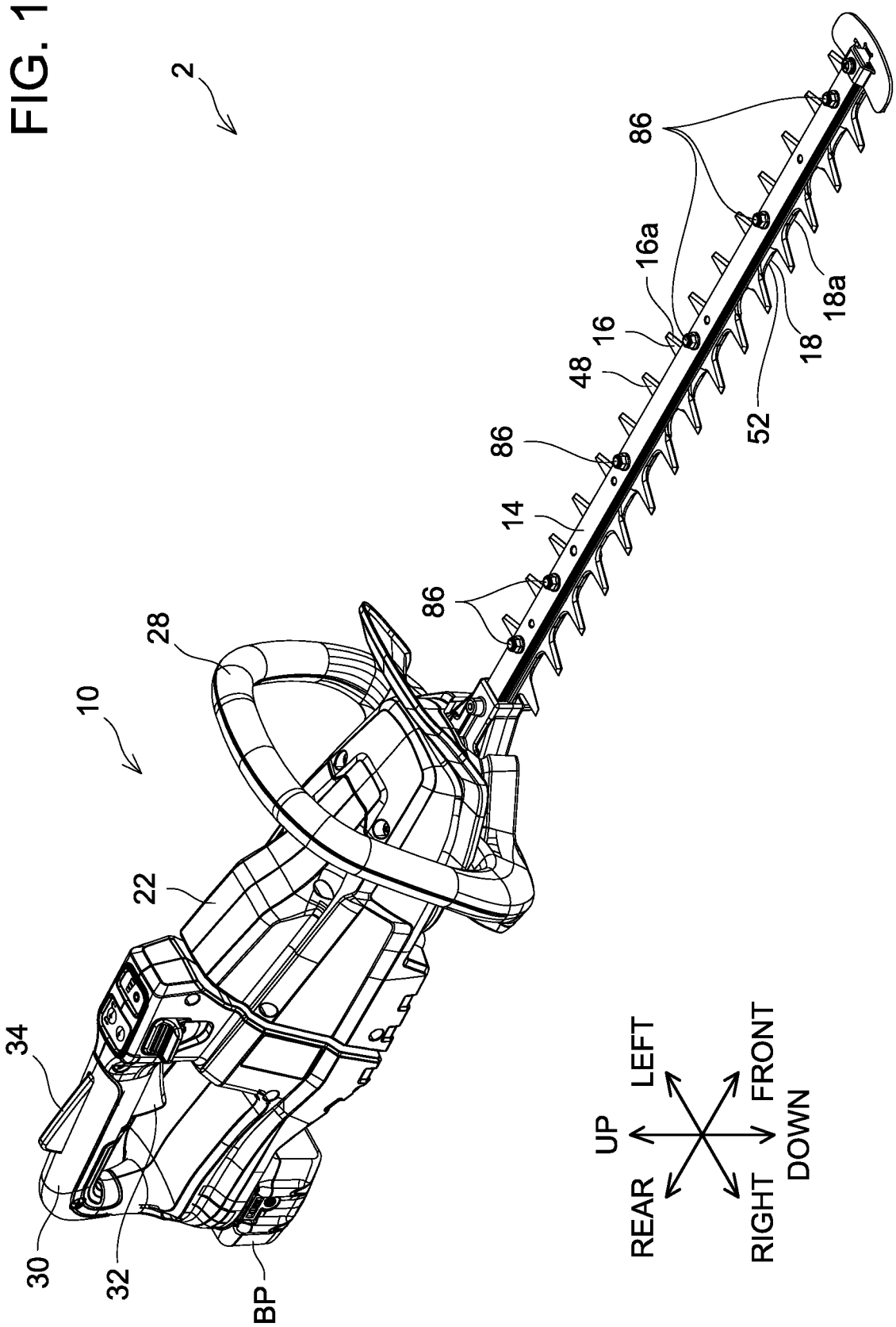
FIG. 1 is a perspective view of a gardening trimmer 2 of a first embodiment.

Representative, non-limiting examples of the present disclosure will now be described in further detail with reference to the attached drawings. This detailed description is merely intended to teach a person of skill in the art further details for practicing preferred aspects of the present teachings and is not intended to limit the scope of the present disclosure. Furthermore, each of the additional features and teachings disclosed below may be utilized separately or in conjunction with other features and teachings to provide improved gardening trimmers, as well as methods for using and manufacturing the same.

Moreover, combinations of features and steps disclosed in the following detailed description may not be necessary to practice the present disclosure in the broadest sense, and are instead taught merely to particularly describe representative examples of the present disclosure. Furthermore, various features of the above-described and below-described representative examples, as well as the various independent and dependent claims, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

In one or more embodiments, a combination of one of the at least one first slot disposed closest to an end of the blade on a housing side and its corresponding guide member may be the second combination.

Vibration of the blade as a whole is reduced at a greater degree when vibration in a direction perpendicular to a shaft of the prime mover and to the first direction that is transmitted from the conversion mechanism to the blade is reduced at a position closer to the conversion mechanism. In the above configuration, the first slot disposed closest to the end of the blade on the housing side is disposed closest to the conversion mechanism. Further, the combination of the first slot disposed closest to the end of the blade on the housing side and its corresponding guide member is the second combination. Due to this, the vibration of the blade generated by the reciprocating motion of the blade can further be reduced.

In one or more embodiments, a combination of the at least one second slot and its corresponding guide member may comprise the second combination.

In the above configuration, the combination of the at least one first slot and its corresponding guide member comprises the second combination, and the combination of the at last one second slot and its corresponding guide member comprises the second combination. Due to this, the vibration of the blade generated by the reciprocating motion of the blade can be reduced.

In one or more embodiments, the plurality of guide members may comprise: a first guide member configured to reduce the frictional resistance generated by the reciprocating motion of the blade; and a second guide member configured to reduce the vibration generated by the reciprocation of the blade. Each of the guide members constituting the first combination may be the first guide member, and each of the guide members consisting the second combination may be the second guide member.

In the above configuration, by changing the configuration of the guide members, the vibration of the blade generated by the reciprocating motion of the blade is reduced, and further the frictional resistance generated by the reciprocating motion of the blade can also be reduced.

In one or more embodiments, the first guide member may have a circular cross-sectional shape, and the second guide member may have a polygonal cross-sectional shape.

In the above configuration, by changing a shape of the guide members, the vibration of the blade generated by the reciprocating motion of the blade is reduced, and further the frictional resistance generated by the reciprocating motion of the blade can also be reduced.

In one or more embodiments, each of the slots may include: a first inner side surface extending along the first direction; and a second inner side surface extending along the first direction and opposing the first inner side surface. In the first combination, a total value of a distance between the first inner side surface and its corresponding guide member and a distance between the second inner side surface and its corresponding guide member may be a first distance. In the second combination, a total value of a distance between the first inner side surface and its corresponding guide member and a distance between the second inner side surface and its corresponding guide member may be a second distance smaller than the first distance.

In the above configuration, by adjusting the first distance related to the slot and the guide member constituting the first combination and the second distance related to the slot and the guide member constituting the second combination, the vibration of the blade generated by the reciprocating motion of the blade is reduced, and further the frictional resistance generated by the reciprocating motion of the blade can also be reduced.

In one or more embodiments, the prime mover may be an electric motor.

In the case where the prime mover is an engine, normally, vibration of the engine itself is greater than vibration of the other members. Due to this, vibration which a user feels is determined based on an amplitude of the vibration of the engine itself. As such, even if the vibration transmitted from the conversion mechanism to the blade is reduced, the vibration which the user feels cannot be reduced in many cases. On the other hand, in the case where the prime mover is the electric motor, of which vibration is small as compared to the engine, the vibration transmitted from the conversion mechanism to the blade becomes a main factor of vibration. Due to this, the vibration which the user feels is determined based on an amplitude of the vibration transmitted from the conversion mechanism to the blade. In the above configuration, the vibration of the blade can sufficiently be reduced by reducing the vibration transmitted from the conversion mechanism to the blade, and the vibration which the user feels can sufficiently be reduced.

In one or more embodiments, the gardening trimmer may further comprise a rechargeable battery pack configured to be detachably attached to the housing and configured to supply electric power to the electric motor.

In the above configuration, a power cable does not have to be included in the gardening trimmer, and handling of the gardening trimmer can be improved.

In one or more embodiments, the gardening trimmer may further comprise a grip disposed on the housing and configured to be gripped by a user.

In the above configuration, the handling of the gardening trimmer can be improved.

First Embodiment

Figure 2:
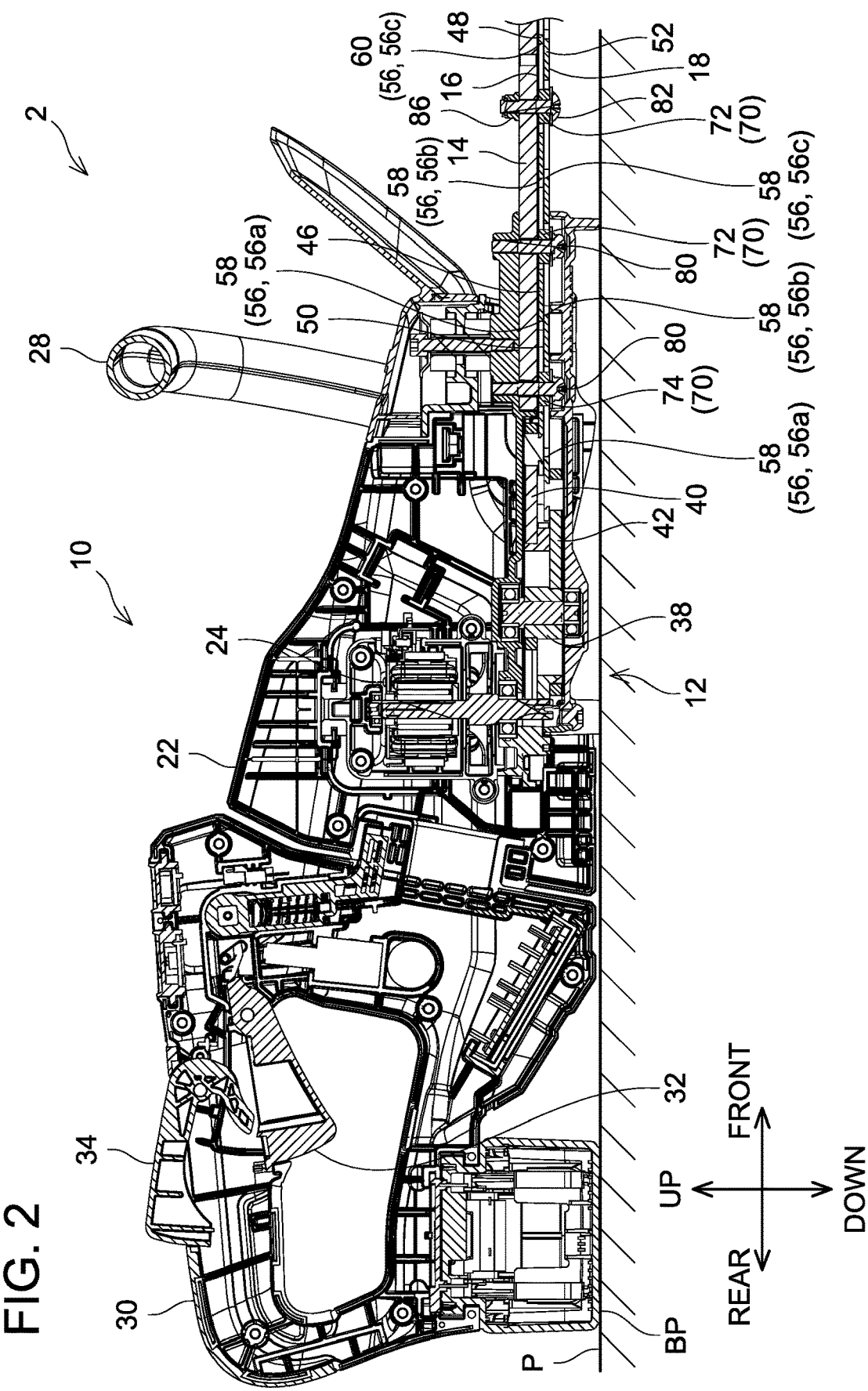
FIG. 2 is a cross-sectional view of the gardening trimmer 2 of the first embodiment.
Figure 3:
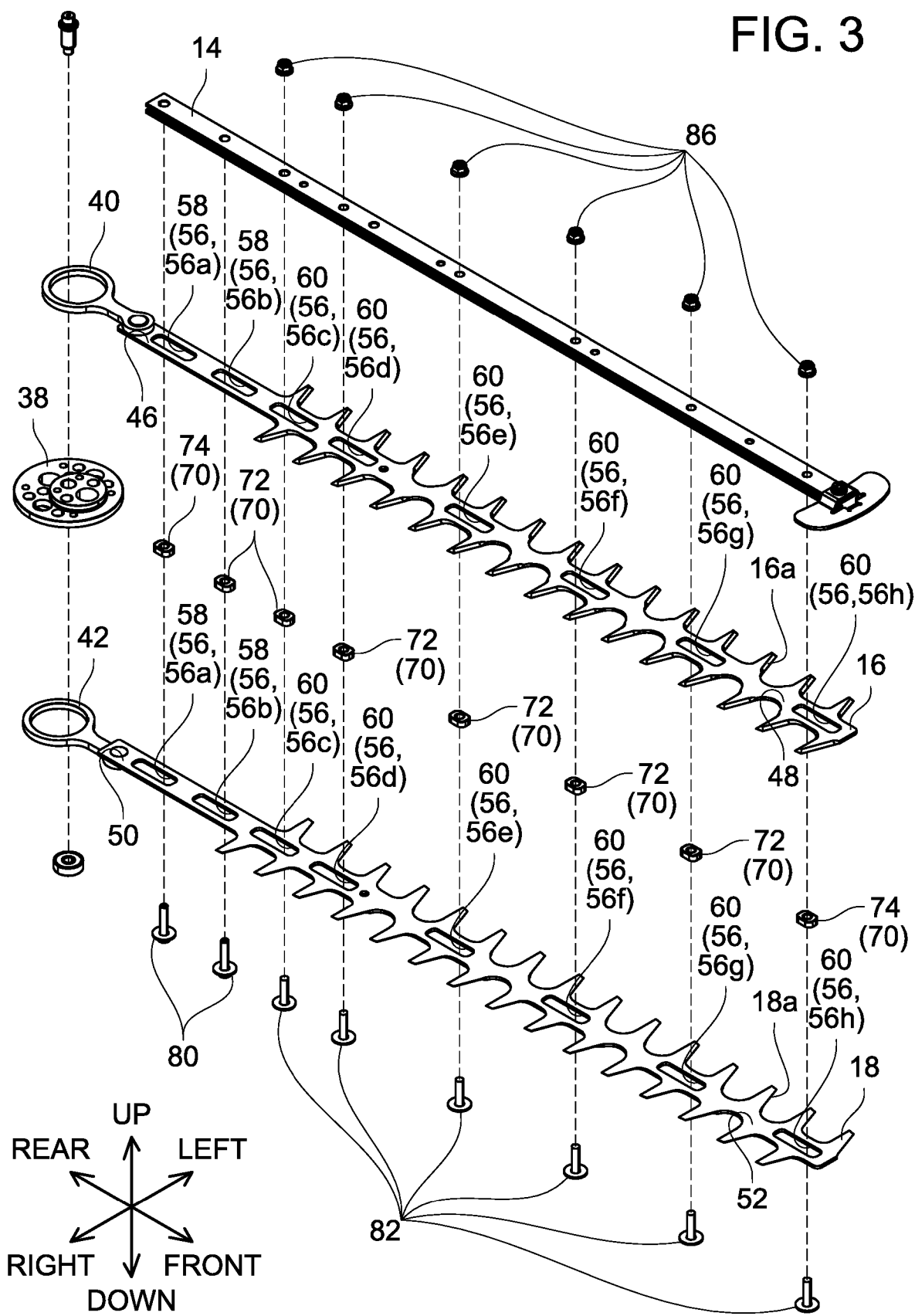
FIG. 3 is a disassembled view showing structures of a pair of blades 16, 18 of the first embodiment.

A gardening trimmer 2 of an embodiment will be described with reference to FIGS. 1 to 6. The gardening trimmer 2 is a gardening tool primarily used for trimming a hedge or a tree, and may also be termed a hedge trimmer. As shown in FIGS. 1 to 3, the gardening trimmer 2 comprises a body 10, a conversion mechanism 12, a guide bar 14, and a pair of blades 16, 18 comprising a first blade 16 and a second blade 18. Hereinbelow, directions will be termed with respect to a state in which the gardening trimmer 2 is placed on a placement surface P such as a ground surface, where a direction perpendicular to the placement surface P is termed an up-down direction, a longitudinal direction of the pair of blades 16, 18, when projected on the placement surface P, is termed a front-rear direction, and a direction perpendicular to both the up-down direction and the front-rear direction is termed a left-right direction.

As shown in FIG. 2, the body 10 comprises a housing 22 and a prime mover 24. The housing 22 is configured such that a battery pack BP can be detachably attached thereto. That is, the gardening trimmer 2 is a cordless power tool that uses the battery pack BP as its power source. In a variant, the gardening trimmer 2 may be configured to be connected to an external power source via a power cable.

As shown in FIG. 1, a front grip 28 and a rear grip 30 are disposed on the housing 22. The front grip 28 is disposed on a front portion of the housing 22, and the rear grip 30 is disposed on a rear portion of the housing 22. The front grip 28 is to be gripped by one hand of a user and the rear grip 30 is gripped by the other hand of the user. Due to this, the user can stably hold the gardening trimmer 2.

A trigger 32 and an unlock lever 34 are disposed on the rear grip 30. When the unlock lever 34 is not pressed in by the user, the trigger 32 is mechanically locked and the user cannot press the trigger 32. Due to this, erroneous operation of the trigger 32 can be prevented. On the other hand, when the unlock lever 34 is pressed in by the user, mechanical lock of the trigger 32 is unlocked and the user can press in the trigger 32.

The guide bar 14 is fixed to the front portion of the housing 22. The guide bar 14 has a narrow plate-like shape extending along the front-rear direction. The guide bar 14 supports the pair of blades 16, 18.

As shown in FIG. 2, the prime mover 24 is disposed inside the housing 22. The prime mover 24 may for example be an electric motor. In a variant, the prime mover 24 may be an engine. The prime mover 24 is configured to operate when the trigger 32 is pressed with the unlock lever 34 pressed in.

The conversion mechanism 12 is a conrod type conversion mechanism. The conversion mechanism 12 comprises a crank cam 38, a first connecting rod 40, and a second connecting rod 42. The crank cam 38 is configured to rotate by rotational motion of a shaft of the prime mover 24 extending in the up-down direction. The first connecting rod 40 and the second connecting rod 42 are connected to the crank cam 38. The first connecting rod 40 is connected to the first blade 16 and the second connecting rod 42 is connected to the second blade 18. The first connecting rod 40 is configured to convert rotational motion of the crank cam 38 into reciprocating motion of the first blade 16 in the front-rear direction. The second connecting rod 42 is configured to convert the rotational motion of the crank cam 38 into reciprocating motion of the second blade 18 in the front-rear direction.

The first blade 16 and the second blade 18 overlap the guide bar 14 in the up-down direction. Further, the first blade 16 and the second blade 18 overlap each other in the up-down direction. The first blade 16 and the second blade 18 extend in the front-rear direction.

As shown in FIG. 3, the first blade 16 comprises a first portion 46 and a second portion 48. The first portion 46 is connected to the first connecting rod 40. In the up-down direction, the first portion 46 partially overlaps the housing 22. The second portion 48 is disposed frontward of the first portion 46. A plurality of blade edges 16a arranged along the front-rear direction is disposed on the second portion 48.

The second blade 18 comprises a first portion 50 and a second portion 52. The first portion 50 is connected to the second connecting rod 42. In the up-down direction, the first portion 50 of the second blade 18 overlaps the first portion 46 of the first blade 16. A plurality of blade edges 18a arranged along the front-rear direction is disposed on the second portion 52. In the up-down direction, the second portion 52 of the second blade 18 overlaps the second portion 48 of the first blade 16. In the gardening trimmer 2, when the user presses the trigger 32 in, the prime mover 24 operates and the second blade 18 reciprocates in antiphase with the first blade 16. Due to this, the blade edges 16a of the first blade 16 and the blade edges 18a of the second blade 18 repeatedly slide across each other, by which branches of the hedge are cut, for example.

Each of the first blade 16 and the second blade 18 has a plurality (eight in the present embodiment) of slots 56. Since the plurality of slots 56 of the first blade 16 has the same configuration as the plurality of slots 56 of the second blade 18, the plurality of slots 56 of the first blade 16 will be described hereinbelow.

The plurality of slots 56 is disposed along the front-rear direction. Each of the plurality of slots 56 extends in the front-rear direction. Each of the plurality of slots 56 penetrates the first blade 16 in its thickness direction (the up-down direction in the present embodiment). Hereinbelow, the plurality of slots 56 may be termed slots 56a, 56b, 56c, 56d, 56e, 56f, 56g, 56h in order from the rear end side of the first blade 16 on the housing 22 side. The slot 56a is disposed at a position closest to the prime mover 24, and the slot 56h is disposed at a position farthest away from the prime mover 24.

Figure 4:
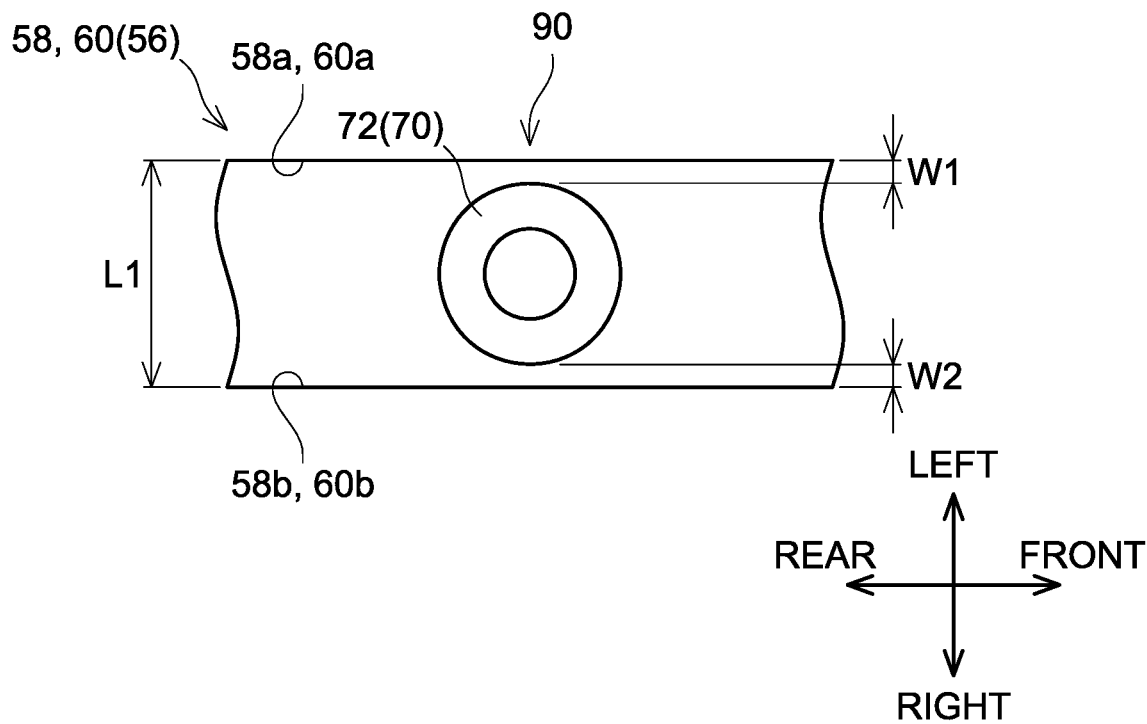
FIG. 4 is a plan view showing a slot 56 and a first guide member 72 of the first embodiment.
Figure 5:
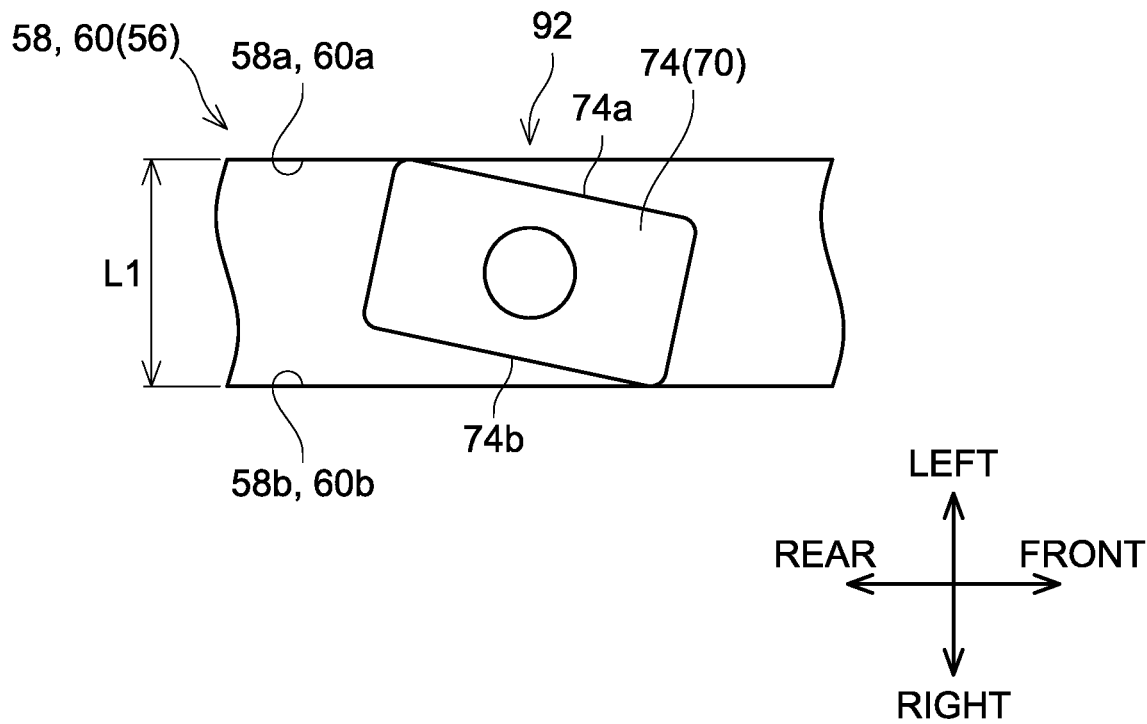
FIG. 5 is a plan view showing a slot 56 and a second guide member 74 of the first embodiment.

The plurality of slots 56 comprises at least one first slot 58 (two in the present embodiment) and at least one second slot 60 (six in the present embodiment). The first slots 58 are disposed in the first portion 46 and the second slots 60 are disposed in the second portion 48. As shown in FIGS. 4 and 5, each of the first slots 58 includes a first inner side surface 58a and a second inner side surface 58b. The first inner side surface 58a and the second inner side surface 58b opposes each other. The first inner side surface 58a and the second inner side surface 58b extend in the front-rear direction.

The second slots 60 have the same configuration as the first slots 58. That is, each second slot 60 includes a first inner side surface 60a and a second inner side surface 60b. The first inner side surface 60a and the second inner side surface 60b opposes each other. The first inner side surface 60a and the second inner side surface 60b extend in the front-rear direction.

As shown in FIG. 3, the gardening trimmer 2 comprises a plurality of (eight in the present embodiment) guide members 70. The guide members 70 are configured to guide the reciprocating motion of the first blade 16 and the second blade 18 in the front-rear direction. One or more (two in the present embodiment) of the guide members 70 are each disposed in its corresponding one of the first slots 58 of the first blade 16 and its corresponding one of the first slots 58 of the second blade 18 that overlap each other in the up-down direction. As shown in FIG. 2, the one or more of the guide members 70 are connected to the guide bar 14 and the front portion of the housing 22 by first bolts 80. The first slots 58 of the first blade 16 and the first slots 58 of the second blade 18 correspond to the guide members 70 connected to the housing 22. Further, as shown in FIG. 3, the rest (six in the present embodiment) of the guide members 70 are each disposed in its corresponding one of the second slots 60 of the first blade 16 and its corresponding one of the second slots 60 of the second blade 18 that overlap in the up-down direction. The rest of the guide members 70 are connected only to the guide bar 14 by second bolts 82 and nuts 86. The second slots 60 of the first blade 16 and the second slots 60 of the second blade 18 correspond to the guide members 70 connected to the guide bar 14.

As shown in FIGS. 4 and 5, the guide members 70 comprise first guide members 72 and second guide members 74. As shown in FIG. 4, each of the first guide members 72 has a circular cross-sectional shape. A diameter of an outer circumferential surface of each first guide member 72 is smaller than a distance L1 between the first inner side surface 58a and the second inner side surface 58b of each first slot 58 and is smaller than a distance L1 between the first inner side surface 60a and the second inner side surface 60b of each second slot 60. That is, a total value of a distance W1 between each of the first inner side surfaces 58a, 60a and the first guide member 72 corresponding thereto and a distance W2 between each of the second inner side surfaces 58b, 60b and the first guide member 72 corresponding thereto is greater than zero. The total value of the distance W1 and the distance W2 may for example be 0.3 mm or less.

As shown in FIG. 5, each second guide member 74 has a polygonal cross-sectional shape, and has a rectangular shape in the present embodiment. Each of the second guide members 74 has a first outer side surface 74a and a second outer side surface 74b. Each first outer side surface 74a opposes the first inner side surface 58a of its corresponding first slot 58 or the first inner side surface 60a of its corresponding second slot 60. Each second outer side surface 74b opposes the second inner side surface 58b of its corresponding first slot 58 or the second inner side surface 60b of its corresponding second slot 60. When the second guide members 74 are fixed by the bolts 80, 82, the second guide members 74 could be fixed in an angled posture with respect to the front-rear direction. When this occurs, the first outer side surface 74a of the tilted second guide member 74 makes contact with the first inner side surface 58a of its corresponding first slot 58 or the first inner side surface 60a of its corresponding second slot 60, and the second outer side surface 74b of the tilted second guide member 74 makes contact with the second inner side surface 58b of its corresponding first slot 58 or the second inner side surface 60b of its corresponding second slot 60.

As shown in FIGS. 4 and 5, a combination of the slots 56 and the guide members 70 comprises a first combination 90 and a second combination 92. As shown in FIG. 4, the first combination 90 is constituted of one slot 56 (first slot 58 or second slot 60) and one first guide member 72 corresponding thereto. As aforementioned, when the first guide members 72 are disposed in the slots 56, the total value of the distance W1 and the distance W2 is greater than zero. Due to this, even when the pair of blades 16, 18 reciprocates relative to each other in the front-rear direction, the first guide members 72 tend not to make contact with the first inner side surfaces 58a, 60a and the second inner side surfaces 58b, 60b of the slots 56, by which frictional resistance of the pair of blades 16, 18 is reduced. On the other hand, when the pair of blades 16, 18 reciprocates relative to each other in the front-rear direction, the pair of blades 16, 18 easily wobbles in the left-right direction, and it is difficult to control vibration of the pair of blades 16, 18 in the left-right direction.

As shown in FIG. 5, the second combination 92 is constituted of one slot 56 (first slot 58 or second slot 60) and one second guide member 74. As aforementioned, when the second guide members 74 are disposed in the slots 56, the second guide members 74 make contact with the first inner side surfaces 58a, 60a and the second inner side surfaces 58b, 60b of the slots 56. Due to this, the pair of blades 16, 18 tends not to wobble in the left-right direction even when the pair of blades 16, 18 reciprocates relative to each other in the front-rear direction, thus the vibration of the pair of blades 16, 18 in the left-right direction can be reduced. Whereas on the other hand, since the pair of blades 16, 18 moves relative to each other in reciprocating motion in the front-rear direction in the state where the second guide members 74 are in contact with the first inner side surfaces 58a, 60a and the second inner side surfaces 58b, 60b of the slots 56, the frictional resistance of the pair of blades 16, 18 is difficult to control.

As shown in FIG. 3, in the present embodiment, the second guide members 74 are disposed in each slot 56a located closest to rear ends of the pair of blades 16, 18 and each slot 56h located farthest away from the rear ends of the pair of blades 16, 18. Further, the first guide members 72 are disposed in the respective slots 56b, 56c, 56d, 56e, 56f, 56g located between the slots 56a, 56h. That is, the second combinations 92 are employed corresponding to the slots 56a, 56h, and the first combinations 90 are employed corresponding to the slots 56b, 56c, 56d, 56e, 56f, 56g. Hereinbelow, this arrangement of the first combinations 90 and the second combinations 92 in the present embodiment will be termed Spec 1.

Figure 6:
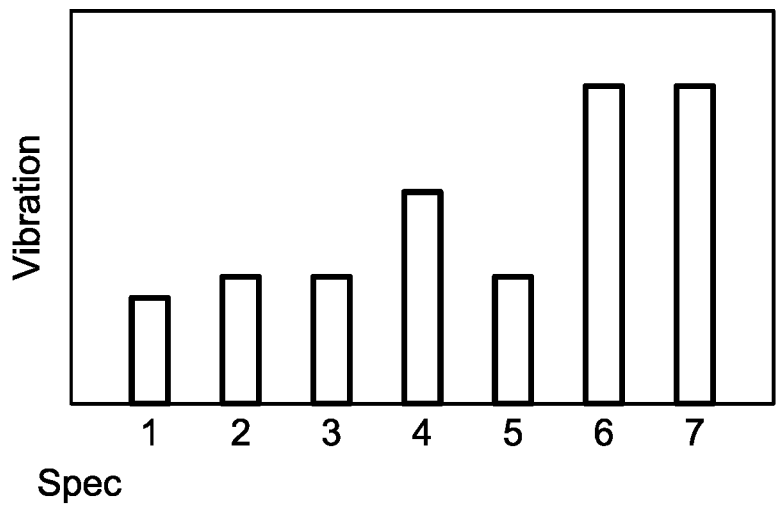
FIG. 6 is a diagram showing a vibration characteristic of the gardening trimmer 2 with various specs.

Results of comparison between the gardening trimmer 2 with Spec 1 of the present embodiment and gardening trimmers with Specs 5, 6, 7 of comparative examples regarding the vibration characteristic and the frictional resistance of the pair of blades 16, 18 are shown in FIG. 6. The gardening trimmer with Spec 5 of the comparative example has the second guide members 74 disposed in all of the slots 56a, 56b, 56c, 56d, 56e, 56f, 56g, 56h of the pair of blades 16, 18. Due to this, in the gardening trimmer with Spec 5, the eight second guide members 74 make contact with the first inner side surfaces 58a, 60a and the second inner side surfaces 58b, 60b of the slots 56, thus the vibration of the pair of blades 16, 18 in the left-right direction caused by the relative reciprocating motion of the pair of blades 16, 18 is reduced. However, in the gardening trimmer with Spec 5, the frictional resistance of the pair of blades 16, 18 caused by the relative reciprocating motion of the pair of blades 16, 18 increases. In the gardening trimmer with Spec 6 of the comparative example, the first guide members 72 are disposed in all of the slots 56a, 56b, 56c, 56d, 56e, 56f, 56g, 56h of the pair of blades 16, 18. Due to this, in the gardening trimmer with Spec 6, the eight first guide members 72 tend not to make contact with the first inner side surfaces 58a, 60a and the second inner side surfaces 58b, 60b of the slots 56, as a result of which the frictional resistance of the pair of blades 16, 18 caused by the relative reciprocating motion of the pair of blades 16, 18 is low. However, in the gardening trimmer with Spec 6, the vibration of the pair of blades 16, 18 in the left-right direction caused by the relative reciprocating motion of the pair of blades 16, 18 is large. In the gardening trimmer with Spec 7, the first guide members 72 are disposed in the respective first slots 58 and the second guide members 74 are disposed in the respective second slots 60 of the pair of blades 16, 18. In the gardening trimmer with Spec 7, the frictional resistance of the pair of blades 16, 18 caused by the relative reciprocating motion of the pair of blades 16, 18 is lower than that of the gardening trimmer with Spec 5 and higher than that of the gardening trimmer with Spec 6. Further, in the gardening trimmer with Spec 7, the first guide members 72 tend not to make contact with the first inner side surfaces 58a, 60a and the second inner side surfaces 58b, 60b of the slots 56 at the first slots 58 disposed close to the prime mover 24, as a result of which the vibration of the pair of blades 16, 18 in the left-right direction caused by the relative reciprocating motion of the pair of blades 16, 18 is large at about the same level as that of the gardening trimmer with Spec 6. Contrary to these, in the gardening trimmer 2 with Spec 1 of the present embodiment, the second guide members 74 make contact with the first inner side surfaces 58a, 60a and the second inner side surfaces 58b, 60b of the slots 56a, 56h at the two points being the slots 56a disposed closest to the prime mover 24 and the slot 56h disposed farthest away from the prime mover 24. Due to this, even in this case in which the first guide members 72 are disposed in the respective slots 56b, 56c, 56d, 56e, 56f, 56g, the vibration of the pair of blades 16, 18 in the left-right direction caused by the relative reciprocating motion of the pair of blades 16, 18 in the gardening trimmer 2 with Spec 1 is reduced to about the same level as that of the gardening trimmer with Spec 5. Moreover, in the gardening trimmer 2 with Spec 1, due to the six first guide members 72 tending not make contact with the first inner side surfaces 58a, 60a and the second inner side surfaces 58b, 60b of the slots 56, the frictional resistance of the pair of blades 16, 18 caused by the relative reciprocating motion of the pair of blades 16, 18 is lower than those of the gardening trimmers with Specs 5 and 7 although it is higher than that of the gardening trimmer with Spec 6.

In the present embodiment, the gardening trimmer 2 comprises: the housing 22; the prime mover 24 disposed in the housing 22; the guide bar 14 extending from the housing 22; the conversion mechanism 12 configured to convert rotational motion of the prime mover 24 to linear motion along a first direction (that is, the front-rear direction); the blades 16, 18 configured to move in reciprocating motion relative to the guide bar 14 along the front-rear direction in response to the linear motion of the conversion mechanism 12 and including the plurality of slots 56 extending along the front-rear direction; and the plurality of guide members 70 each disposed in the corresponding slot 56 of the plurality of slots 56 of the blades 16, 18 and configured to guide the relative reciprocating motion of the blades 16, 18. The plurality of slots 56 comprises: at least one first slot 58 in which the corresponding guide member 70 of the guide members 70 that is connected to the housing 22 is disposed; and at least one second slot 60 in which a corresponding guide member 70 of the guide members 70 that is connected to the guide bar 14 is disposed. The combination of the slots 56 and the guide members 70 comprises: the first combination 90 configured to reduce frictional resistance generated by the reciprocating motion of the blades 16, 18; and the second combination 92 configured to reduce vibration generated by the reciprocating motion of the blades 16, 18. At least one combination of the at least one first slot 58 and its corresponding guide member 70 is the second combination 92. According to this configuration, vibration in the left-right direction perpendicular to the shaft of the prime mover 24 and to the front-rear direction is transmitted to the blades 16, 18. Due to this, if the combination of the first slot 58 and its corresponding guide member 70 that is connected to the housing 22 is the first combination 90, the vibration of the blades 16, 18 in the left-right direction cannot sufficiently be reduced. In the above configuration, since at least one combination of the at least one first slot 58 and its corresponding guide member 70 is the second combination 92, the vibration of the blades 16, 18 in the left-right direction can be reduced. Further, since the combination of the slots 56 and the guide members 70 comprises the first combination 90, the frictional resistance generated by the reciprocating motion of the blades 16, 18 can be reduced.

Further, a combination of one of the at least one first slot 58 disposed closest to an end of each of the blades 16, 18 on the housing 22 side and its corresponding guide member 70 is the second combination 92. Vibration of the blades 16, 18 as a whole in the left-right direction is reduced at a greater degree when vibration in the left-right direction is transmitted from the conversion mechanism 12 to the blades 16, 18 is reduced at a position closer to the conversion mechanism 12. In the above configuration, the one of the at least one first slot 58 (that is, the slot 56a) disposed closest to the end of each of the blades 16, 18 on the housing 22 side is disposed closest to the conversion mechanism 12. Further, the combination of the slot 56a and its corresponding guide member 70 is the second combination 92. Due to this, the vibration of the blades 16, 18 generated by the reciprocating motion of the blades 16, 18 can further be reduced.

Further, a combination of the at least one second slot 60 and its corresponding guide member 70 comprises the second combination 92. In the above configuration, the combination of the at least one first slot 58 and its corresponding guide member 70 comprises the second combination 92, and the combination of the at last one second slot 60 and its corresponding guide member 70 comprises the second combination 92. Due to this, the vibration of the blades 16, 18 generated by the reciprocating motion of the blades 16, 18 can be reduced.

Further, the plurality of guide members 70 comprises: the first guide members 72 configured to reduce the frictional resistance generated by the reciprocating motion of the blades 16, 18; and the second guide members 74 configured to reduce the vibration generated by the reciprocation of the blades 16, 18. Each of the guide members 70 constituting the first combination 90 is the first guide member 72, and each of the guide members 70 consisting the second combination 92 is the second guide member 74. In the above configuration, by changing the configuration of the guide members 70, the vibration of the blades 16, 18 generated by the reciprocating motion of the blades 16, 18 is reduced, and further the frictional resistance generated by the reciprocating motion of the blades 16, 18 can also be reduced.

Further, the first guide members 72 have a circular cross-sectional shape, and the second guide members 74 have a polygonal cross-sectional shape. In the above configuration, by changing a shape of the guide members 70, the vibration generated by the reciprocating motion of the blades 16, 18 can be reduced, and further the frictional resistance generated by the reciprocating motion of the blades 16, 18 can also be reduced.

Further, the prime mover 24 is an electric motor. Here, in the case where the prime mover 24 is an engine, normally, vibration of the engine itself is greater than vibration of the other members. Due to this, vibration which a user feels is determined based on an amplitude of the vibration of the engine itself. As such, even if the vibration transmitted from the conversion mechanism 12 to the blades 16, 18 is reduced, the vibration which the user feels tend not to be reduced in many cases. On the other hand, in the case where the prime mover 24 is the electric motor, of which vibration is small as compared to the engine, the vibration transmitted from the conversion mechanism 12 to the blades 16, 18 becomes a main factor of vibration. Due to this, the vibration which the user feels is determined based on an amplitude of the vibration transmitted from the conversion mechanism 12 to the blades 16, 18. In the above configuration, the vibration of the blades 16, 18 can sufficiently be reduced by reducing the vibration transmitted from the conversion mechanism 12 to the blades 16, 18, and the vibration which the user feels can sufficiently be reduced.

Further, the gardening trimmer 2 further comprises the rechargeable battery pack BP configured to be detachably attached to the housing 22 and configured to supply electric power to the electric motor. In the above configuration, a power cable does not have to be included in the gardening trimmer 2, and handling of the gardening trimmer 2 can be improved.

Further, the gardening trimmer 2 further comprises the grips 28, 30 disposed on the housing 22 and configured to be gripped by a user. In the above configuration, the handling of the gardening trimmer 2 can be improved.

First Variant of First Embodiment

In a first variant of the first embodiment, the arrangement of the first combinations 90 and the second combinations 92 is different from that of the first embodiment. In the first variant of the first embodiment, the first guide member 72 is disposed instead of the second guide member 74 in the slot 56*h* closest to front end of each of the pair of blades 16, 18. Hereinbelow, the gardening trimmer 2 of the first variant of the first embodiment will be termed as having Spec 2.

In the gardening trimmer 2 with Spec 2, in the slot 56*a* disposed closest to the prime mover 24, the second guide member 74 makes contact with the first inner side surface 58*a* and the second inner side surface 58*b* in the slot 56*a*. Due to this, as shown in FIG. 6, the vibration of the pair of blades 16, 18 in the left-right direction caused by the relative reciprocating motion of the pair of blades 16, 18 is reduced to about the same level as that of the gardening trimmer 2 with Spec 1 of the first embodiment. Further, since the seven first guide members 72 tend not to make contact with the first inner side surfaces 58*a*, 60*a* or the second inner side surfaces 58*b*, 60*b* of the slots 56, the frictional resistance of the pair of blades 16, 18 caused by the relative reciprocating motion of the pair of blades 16, 18 is at about the same level as that of the gardening trimmer 2 with Spec 1 although it is higher than that of the gardening trimmer with Spec 6 of the comparative example.

Second Variant of First Embodiment

In a second variant of the first embodiment, the arrangement of the first combinations 90 and the second combinations 92 is different from that of the first embodiment. In the second variant of the first embodiment, the second guide members 74 are disposed in all of the first slots 58, and the first guide members 72 are disposed in all of the second slots 60. Hereinbelow, the gardening trimmer 2 of the second variant of the first embodiment will be termed as having Spec 3.

As shown in FIG. 6, in the gardening trimmer 2 with Spec 3, the vibration of the pair of blades 16, 18 in the left-right direction caused by the relative reciprocating motion of the pair of blades 16, 18 is reduced to about the same level as that of the gardening trimmer 2 with Spec 1 of the first embodiment. Further, since the six first guide members 72 tend not to make contact with the first inner side surfaces 60*a* or the second inner side surfaces 60*b* of the slots 56, the frictional resistance of the pair of blades 16, 18 caused by the relative reciprocating motion of the pair of blades 16, 18 is at about the same level as that of the gardening trimmer 2 with Spec 1 although it is higher than that of the gardening trimmer with Spec 6 of the comparative example.

Third Variant of First Embodiment

In a third variant of the first embodiment, the arrangement of the first combinations 90 and the second combinations 92 is different from that of the first embodiment. In the third variant of the first embodiment, the second guide member 74 is disposed in the slot 56*b* (first slot 58), and the first guide members 72 are respectively disposed in the slot 56*a* (first slot 58) and the slots 56*c*, 56*d*, 56*e*, 56*f*, 56*g*, 56*h* (second slots 60). Hereinbelow, the gardening trimmer 2 in the third variant of the first embodiment will be termed as having Spec 4.

In the gardening trimmer 2 with Spec 4, although the first guide member 72 is disposed in the slot 56*a* disposed closest to the prime mover 24, the second guide member 74 is disposed in the slot 56*b* disposed adjacent to the slot 56*a*. Due to this, as shown in FIG. 6, the vibration of the pair of blades 16, 18 in the left-right direction caused by the relative reciprocating motion of the pair of blades 16, 18 is lower than that of the gardening trimmers with Specs 6 and 7 although it is higher than that of the gardening trimmer 2 with Spec 1 of the first embodiment. Further, since the seven first guide members 72 tend not to make contact with the first inner side surfaces 58*a*, 60*a* or the second inner side surfaces 58*b*, 60*b* of the slots 56, the frictional resistance of the pair of blades 16, 18 caused by the relative reciprocating motion of the pair of blades 16, 18 is at about the same level as that of the gardening trimmer 2 with Spec 1 although it is higher than that of the gardening trimmer with Spec 6 of the comparative example.

Second Embodiment

Figure 7:
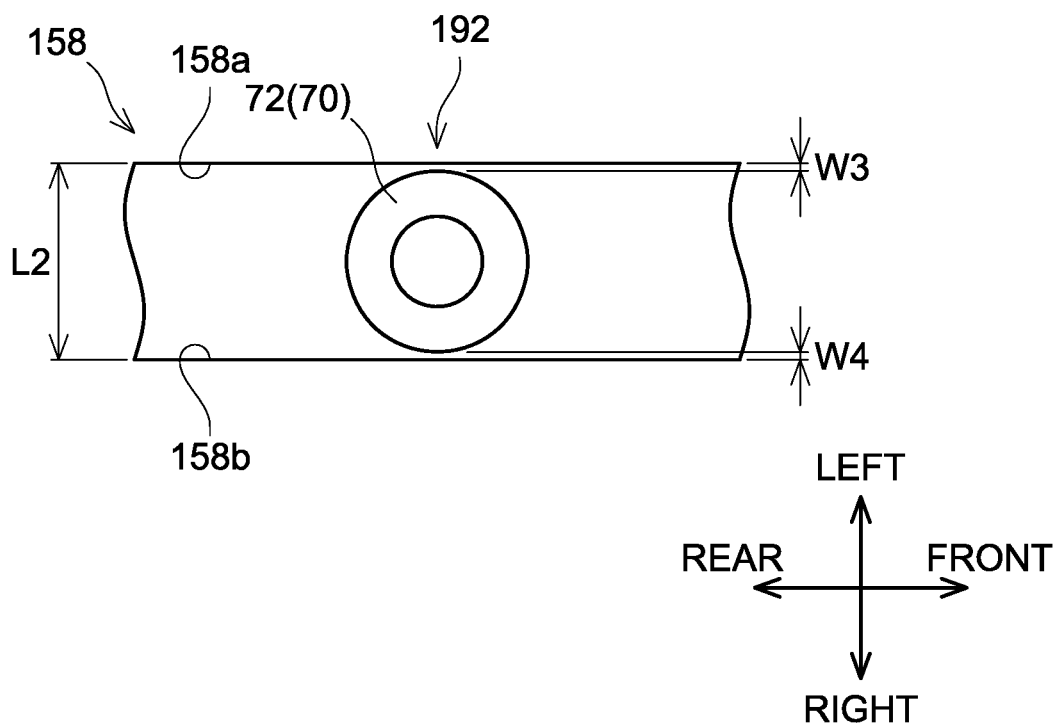
FIG. 7 is a plan view showing a third slot 158 and a first guide member 72 of a second embodiment.

A second embodiment will be described with reference to FIG. 7. In the second embodiment, the guide members 70 comprise only the first guide members 72 and not the second guide members 74. Further, each of the first blade 16 and the second blade 18 comprises, in addition to the slots 56 having the same configuration as that of the first embodiment, at least one third slot 158 as shown in FIG. 7. A distance L2 between a first inner side surface 158*a* and a second inner side surface 158*b* of each third slot 158 is smaller than the distance L1 between the first inner side surface 58*a* and the second inner side surface 58*b* of each slot 56. Due to this, a total value of a distance W3 between the first inner side surface 158*a* of each third slot 158 and its corresponding first guide member 72 and a distance W4 between the second inner side surface 158*b* of each third slot 158 and its corresponding first guide member 72 is smaller than the total value of the distance W1 between each of the first inner side surfaces 58*a*, 60*a* of each slot 56 and its corresponding first guide member 72 and the distance W2 between each of the second inner side surfaces 58*b*, 60*b* of each slot 56 and its corresponding first guide member 72. In the present embodiment, the total value of the distance W3 and the distance W4 is 0.2 mm or less.

In the second embodiment, a combination of the slots 56, 158 and the guide members comprises the first combination 90 constituted of one slot 56 and one first guide member 72 corresponding thereto, and a second combination 192 constituted of one third slot 158 and one first guide member 72 corresponding thereto. Arrangement of the first combination 90 in the second embodiment is the same as the arrangement of the first combination 90 in the first embodiment, and arrangement of the second combination 192 in the second embodiment is the same as the arrangement of the second combinations 92 in the first embodiment. Since the total value of the distance W3 and the distance W4 in each of the second combinations 192 is smaller than the total value of the distance W1 and the distance W2 in each of the first combinations 90, the vibration of the pair of blades 16, 18 in the left-right direction caused by the relative reciprocating motion of the pair of blades 16, 18 is reduced in the second combinations 192 as compared to the first combinations 90. On the other hand, the frictional resistance of the pair of blades 16, 18 caused by the relative reciprocating motion of the pair of blades 16, 18 becomes higher in the second combinations 192 than in the first combinations 90.

In the present embodiment, each of the slots 56 includes: one of the first inner side surfaces 58a, 60a extending along the front-rear direction; and corresponding one of the second inner side surfaces 58b, 60b extending along the front-rear direction and opposing the one of the first inner side surface 58a, 60a. Each of the slots 158 includes: the first inner side surface 158a extending along the front-rear direction; and the second inner side surface 158b extending along the front-rear direction and opposing the first inner side surfaces 158a. In the first combination 90, the total value of the distance W1 between each of the first inner side surfaces 58a, 60a and its corresponding first guide member 72 and the distance W2 between each of the second inner side surfaces 58b, 60b and its corresponding first guide member 72 is a first distance. In the second combination 192, the total value of the distance W3 between the first inner side surface 158a and its corresponding first guide member 72 and the distance W4 between the second inner side surface 158b and its corresponding first guide member 72 is a second distance smaller than the first distance. In the above configuration, by adjusting the first distance (that is, the total value of the distance W1 and the distance W2) related to the slot 56 and the first guide member 72 constituting the first combination 90 and the second distance (that is, the total value of the distance W3 and the distance W4) related to the third slot 158 and the first guide member 72 constituting the second combination 192, the frictional resistance generated by the reciprocating motion of the blades 16, 18 can be reduced while the vibration of the blade 16, 18 generated by the reciprocating motion of the blade is reduced.

In an embodiment, only one of the first blade 16 and the second blade 18 may reciprocate. In this case, the other of the first blade 16 and the second blade 18 may be fixed immovably to the guide bar 14. Further, the guide bar 14 itself may constitute the other of the first blade 16 and the second blade 18.

In an embodiment, regardless of whether the second guide member 74 is disposed in the slot 56h, the other second guide members 74 may be disposed in the other second slots 60 (slots 56c, 56d, 56e, 56f, 56g). Further, regardless of whether the second combination 192 is employed to correspond to the slot 56h, the second combinations 192 may be employed corresponding to the other second slots 60 (slots 56c, 56d, 56e, 56f, 56g).

In an embodiment, the conversion mechanism 12 may be a cam-crank type conversion mechanism.

What is claimed is:

1. A gardening trimmer, comprising:
   a housing;
   a prime mover disposed in the housing;
   a guide bar extending from the housing;
   a conversion mechanism configured to convert rotational motion of the prime mover to linear motion along a first direction;
   a blade configured to move in reciprocating motion relative to the guide bar along the first direction in response to the linear motion of the conversion mechanism and including a plurality of slots extending along the first direction; and
   a plurality of guide members each disposed in a corresponding slot of the plurality of slots of the blade and configured to guide the relative reciprocating motion of the blade,
   wherein
   the plurality of slots comprises:
      at least one first slot in which a corresponding guide member of the guide members that is connected to the housing and the guide bar is disposed; and
      a plurality of second slots in which a corresponding guide member of the guide members that is connected to the guide bar and is not connected to the housing is disposed,
   the at least one first slot includes:
      a first inner side surface extending along the first direction; and
      a second inner side surface extending along the first direction and opposing the first inner side surface in a second direction perpendicular to the first direction,
   each of the second slots includes:
      a third inner side surface extending along the first direction; and
      a fourth inner side surface extending along the first direction and opposing the third inner side surface in the second direction,
   the plurality of guide members comprises:
      at least one primary guide member, the at least one primary guide member being disposed in the at least one first slot, wherein with respect to the at least one primary guide member, a total value of a shortest distance between the at least one primary guide member and the first inner side surface in the second direction and a shortest distance between the at least one primary guide member and the second inner side surface in the second direction is a first distance; and
      a plurality of secondary guide members, each of the secondary guide members being disposed in a corresponding one of the second slots, wherein with respect to one of the plurality of secondary guide members, a total value of a shortest distance between the one of the plurality of secondary guide members and the third inner side surface in the second direction and a shortest distance between the one of the plurality of secondary guide members and the fourth inner side surface in the second direction is a second distance, and
   the first distance is smaller than the second distance.

2. The gardening trimmer according to claim 1, wherein the at least one first slot in which the at least one primary guide member is disposed corresponds to a housingside end of the blade among the plurality of the slots.

3. The gardening trimmer according to claim 1, wherein with regard to the secondary guide member different from the one of the plurality of second guide members, a total value of a shortest distance between the different secondary guide member and the third inner side surface in the second direction and a shortest distance between the different secondary guide member and the fourth inner side surface in the second direction is the first distance.

4. The gardening trimmer according to claim 1, wherein the prime mover is an electric motor.

5. The gardening trimmer according to claim 4, further comprising a rechargeable battery pack configured to be detachably attached to the housing and configured to supply electric power to the electric motor.

6. The gardening trimmer according to claim 1, further comprising a grip disposed on the housing and configured to be gripped by a user.

7. The gardening trimmer according to claim 1, the at least one first slot is at least two first slots, the plurality of guide members comprises at least one different primary guide member disposed in one of the at least two first slots so that the at least one different primary guide member is in contact with the first inner side surface and the second inner side surface.

8. The gardening trimmer according to claim 7, wherein
the one of the plurality of secondary guide members has a circular cross-sectional shape, and
the at least one different primary guide member has a polygonal cross-sectional shape.

\* \* \* \* \*